March 18, 1924.

H. G. JUNGK ET AL 1,486,903

MOTOR MOUNTING FOR JACK SHAFT GEAR DRIVE

Filed April 18, 1922

WITNESSES:

INVENTORS
Herbert G Jungk and
Robert Siegfried.
BY
ATTORNEY

Patented Mar. 18, 1924.

1,486,903

UNITED STATES PATENT OFFICE.

HERBERT G. JUNGK AND ROBERT SIEGFRIED, OF PITTSBURGH, PENNSYLVANIA, ASSIGNORS TO WESTINGHOUSE ELECTRIC AND MANUFACTURING COMPANY, A CORPORATION OF PENNSYLVANIA.

MOTOR MOUNTING FOR JACK-SHAFT GEAR DRIVE.

Application filed April 18, 1922. Serial No. 555,112.

*To all whom it may concern:*

Be it known that we, HERBERT G. JUNGK, a citizen of the United States, and a resident of Pittsburgh, in the county of Allegheny and State of Pennsylvania, and ROBERT SIEGFRIED, a citizen of the United States, and a resident of Pittsburgh, in the county of Allegheny and State of Pennsylvania, have invented a new and useful Improvement in Motor Mountings for Jack-Shaft Gear Drive, of which the following is a specification.

Our invention relates to electric-locomotive driving mechanisms, more especially to mountings for securing motors to locomotive side frames.

It is among the objects of this invention to provide a structure which shall be adapted to rigidly secure the driving mechanism to the side frame members and which shall provide a tie-rod connection therebetween to form a rigid structure of the various assembled parts constituting the drive mechanism.

It is another object of this invention to provide a structure of the above designated type which shall be of simple design, which shall be compact, which shall be readily accessible and interchangeable for the renewal of parts and which shall maintain a uniform and rigid center distance between the rotating shafts.

Various designs have been proposed for obtaining rigid and compact drive-gear construction for electric-locomotive drives which consisted of motor cradle mountings secured to the side frames and forming a part of the motor housing, such as is disclosed in our copending application, Serial No. 528,922, filed January 13, 1922, (Case No. 9333). Another type of construction consisted of means for securing the motor frame directly to the side frames as disclosed in our copending application, Serial No. 528,923, filed January 13, 1922, (Case No. 9499). These and various other structures have been proposed for specific applications.

In our present invention we provide a motor-bracket support which is secured to the side frames and which is adapted to securely mount the motor in positive and rigid alignment with the frame and journal bearing of the driving gear.

Figure 1:
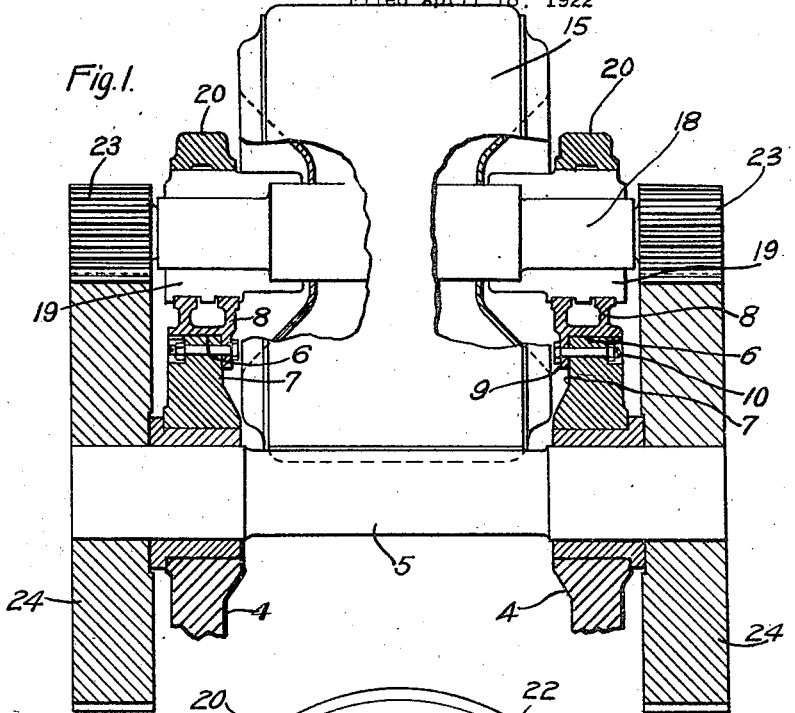
Figure 2:
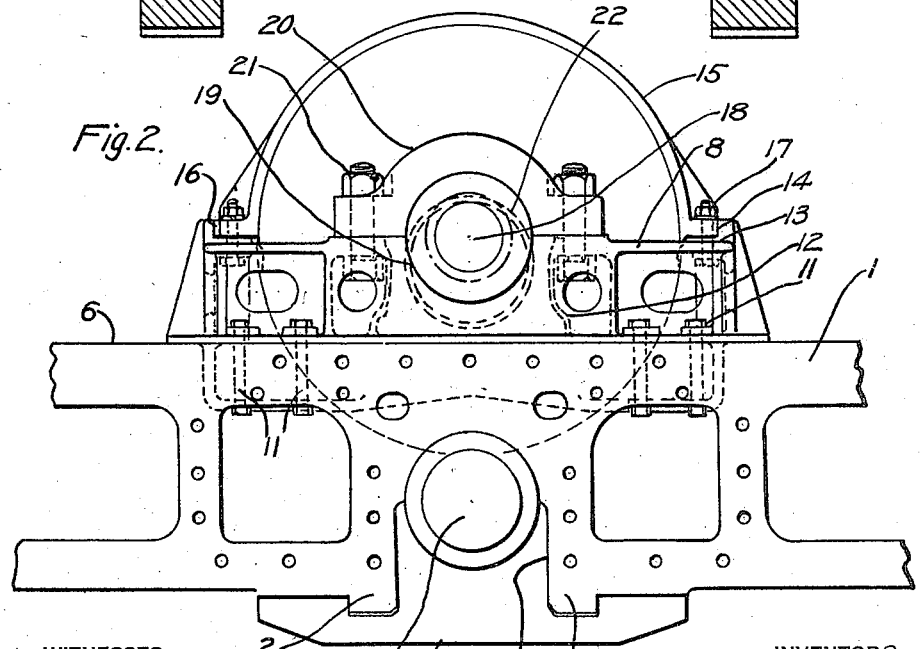

In the accompanying drawing constituting a part hereof and in which like reference characters designate like parts, Figure 1 is a cross-sectional view, partially in elevation, of a driving mechanism embodying our invention; and Fig. 2 is a side elevational view showing the relative position of the motor support or mounting bracket with respect to the side frame.

The driving mechanism consists of a pair of side frames 1 parallel to the locomotive bed. The side frames are provided with a pair of vertical supporting columns 2 having an opening 3 therebetween adapted to receive a flanged journal block 4 for rotatably mounting a jackshaft 5, which is disposed transversely of the side frames. The top surface 6 and the inner side faces 7 of the side frames 1 are accurately machined to receive a supporting bracket 8 provided with depending flanges 9 which seat against the surfaces 7. The support or bracket 8 is a hollow rectangular shaped channel frame and is secured to the side frames by a plurality of transverse bolts 10 and vertical bolts 11 to produce a rigid tie-rod connection across the two frames and to provide a solid seat to which the motor is secured.

Oil wells 12 constituting integral parts of the bracket 8 are provided in the two sides thereof in alignment with the frames 1. The top of the bracket 8 is provided with an angular seat having the faces 13 and 14 accurately machined to receive correspondingly shaped flanges of a motor frame 15, which is firmly secured between the flanged faces 14 by a wedge or key 16 and to the bracket 8 by a plurality of bolts 17. The motor shaft 18 is seated in journal supports 19 and is secured therein by bearing caps 20 which are bolted to the bracket 8 by the bolts 21. Oil rings 22 on the shaft 18 extend into the oil wells or chambers 12. The ends of the shaft 18 are provided with pinions 23 in working alignment and engagement with gears 24 which are securely mounted on the ends of the jackshaft 5.

It will be readily understood from the above description of our invention that the combined bracing of the supporting bracket 8 and bearing caps 20 provides a rigid support for the motor 15 and they also function as a tie-rod across the side frames 1. The combined function of the bracket 8 as a tie-rod, motor support, oil wells and journal housings greatly simplifies the structural design of the driving mechanism, making the parts readily accessible and interchangeable.

Although we have described a specific embodiment of our invention, various modifications may be made in the details of construction thereof without departing from the principles herein set forth. For instance, the supporting bracket 8 between the motor and the side frames may be secured thereto in various ways other than shown. The oil wells need not be a part of the bracket but may form an integral part of the journal support of the motor housing, or the jackshaft journal may be constructed otherwise than shown. These and other changes may be made in the details of construction of our invention without departing from the principles herein set forth.

We claim as our invention:

1. The combination with a locomotive drive mechanism, of a pair of side frames and a motor support disposed transversely thereof and secured thereto, said support comprising a substantially rectangular hollow frame provided with projecting side flanges to locate a motor housing.

2. The combination with a locomotive drive mechanism, of a pair of side frames and a combined tie-rod and motor support disposed transversely thereof and secured thereto, said support comprising a substantially rectangular hollow frame and projecting side flanges to locate a motor housing relative to a drive gear.

3. The combination with a locomotive drive mechanism, of a pair of side frames and a combined tie-rod and motor support disposed transversely thereof and secured thereto, said support comprising a substantially rectangular hollow frame provided with depending flanges to engage said side frames and projecting side flanges to locate a motor housing relative to a drive gear.

4. The combination with a locomotive drive mechanism, of a pair of side frames and a combined tie-rod and motor support disposed transversely thereof and secured thereto, said support comprising a substantially rectangular hollow frame having a plurality of oil wells therein and provided with depending flanges to engage said frames and projecting side flanges to locate a motor housing relative to a drive gear, said motor housing being secured to said support.

5. The combination with a locomotive drive mechanism, of a pair of side frames and a combined tie-rod and motor support disposed transversely thereof and secured thereto, said support comprising a substantially rectangular hollow frame having a plurality of oil wells therein and provided with depending flanges to engage said frames and projecting side flanges to locate a motor housing relative to a drive gear, said motor housing being wedged between said projecting flanges.

6. The combination with a locomotive drive mechanism, of a pair of side frames and a combined tie-rod and motor support disposed transversely thereof and secured thereto, said support comprising a substantially rectangular hollow frame having a plurality of oil wells therein and provided with depending flanges to engage said frames and projecting side flanges to locate a motor housing relative to a drive gear, said motor housing being secured between said projecting flanges by a wedge-key to rigidly fix its position.

In testimony whereof, we have hereunto subscribed our names this 17th day of April, 1922.

HERBERT G. JUNGK.
ROBERT SIEGFRIED.